July 24, 1962
R. M. PEFFER
3,046,325
EMERGENCY BATTERY
Filed Aug. 2, 1960
2 Sheets-Sheet 1
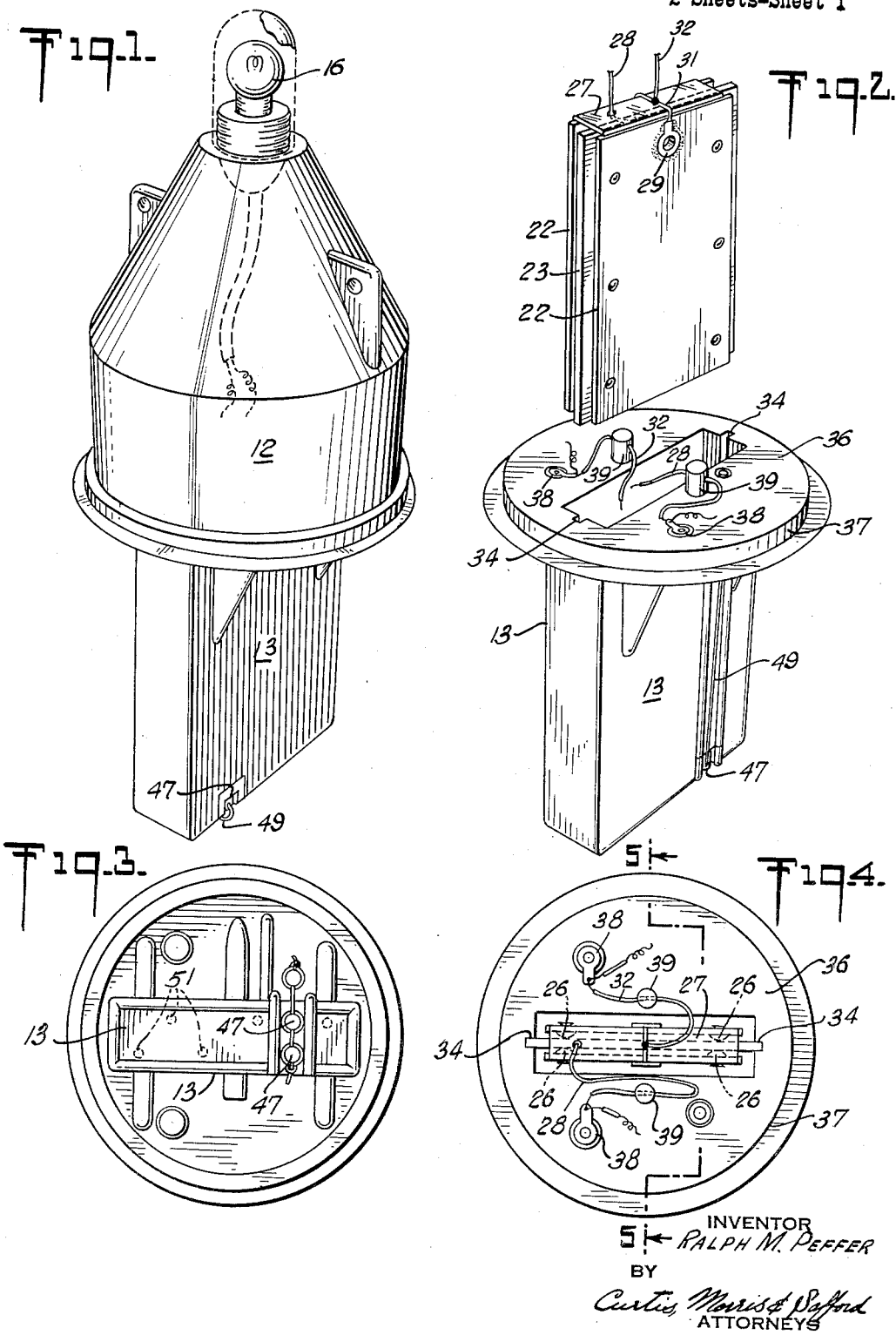
INVENTOR
RALPH M. PEFFER
BY
Curtis, Morris & Safford
ATTORNEYS July 24, 1962 R. M. PEFFER 3,046,325
EMERGENCY BATTERY
Filed Aug. 2, 1960 2 Sheets-Sheet 2
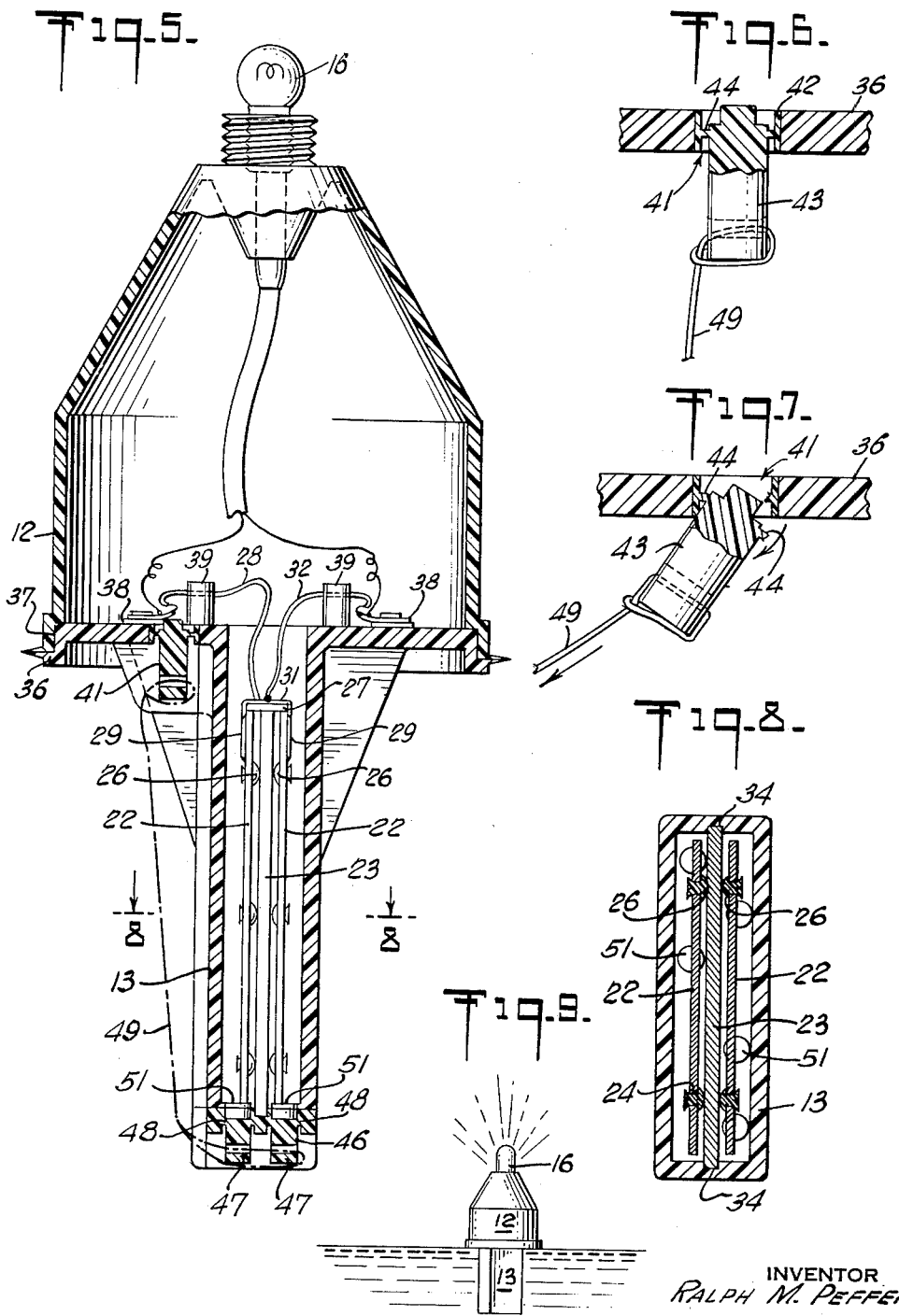
INVENTOR
RALPH M. PEFFER
BY
Curtis, Morris & Safford
ATTORNEYS

United States Patent Office 3,046,325
Patented July 24, 1962

3,046,325
EMERGENCY BATTERY
Ralph M. Peffer, Camp Hill, Pa., assignor to Resistance Products Company, Harrisburg, Pa.
Filed Aug. 2, 1960, Ser. No. 46,934
3 Claims. (Cl. 136—90)

This invention relates to a battery and more particularly to a self-floating emergency battery.

The kind of batteries with which the invention is concerned find particular utility as emergency power and signaling devices for wrecked aircraft, on life rafts, and the like. Necessarily, a most desirable characteristic of such a battery is reliability. On the other hand, such qualities as simplicity, economy of manufacture, light weight and portability are also highly desirable. Usually in prior devices, one or more of these other desirable charactertistics had to be sacrificed to obtain reliability.

One object of this invention is thus to simplify and improve the construction of an emergency battery with no sacrifice in reliability.

A further object is to provide an effective, yet inexpensive battery arrangement which is self-actuating, and also light enough to float, when dropped in water.

A still further object of the invention is to provide a light, portable battery which has long shelf life and which can quickly and easily be put in service when needed.

In accordance with the invention, in one embodiment thereof, the housing of the battery is made in two pieces, each of molded plastic. The upper portion of the housing forms an air bell and the lower portion forms a chamber for suitable battery plates. This housing is hermetically sealed and does not contain an electrolyte so that the battery prior to use is inactive and has a long shelf life. To put the battery into operation it is necessary to fill its chamber with an electrolyte, the plates of the battery being chosen so that sea water, for example, suffices to activate them.

Mounted in the lower portion of the housing are a plurality of plugs which are integrally molded as part of the housing and which are held in place by easily frangible, water-tight webs, the plugs, webs, and housing forming a unitary impervious structure. Thus, until the plugs are removed, the housing is completely sealed against moisture, which insures that the battery plates and connecting leads, will not be corroded or used up during storage of the unit. Two of these plugs are located on the bottom of the lower part of the housing, and a third plug is mounted on the underside of the upper part. The plugs are all interconnected by a pull cord which when the unit is thrown into the sea, for example, immediately tears the plugs out, the holes left by the lowest ones permitting water (electrolyte) to enter the battery chamber. As the battery fills the opening left by the plug in the underside of the upper part of the housing serves as a vent permitting the escape of air until it is closed by the rising water. Thereafter, the upper part of the housing serves as an air bell which is effectively sealed, thus insuring that the unit will float upright.

A better understanding of the invention will best be gained from the following detailed description given in conjunction with the accompanying drawings, in which:

FIGURE 1 is a perspective view of a battery unit embodying features of the present invention;

FIGURE 2 is an exploded view of the lower portion of the unit of FIGURE 1 showing the battery plates;

FIGURE 3 is a bottom view of the unit of FIGURE 1;

FIGURE 4 is a top view of the lower part of the unit shown in FIGURE 2;

FIGURE 5 is an enlarged sectional view taken along the lines 5—5 of FIGURE 4;

FIGURES 6 and 7 are enlarged detail views of the plugs;

FIGURE 8 is a sectional view along the lines 8—8 of FIGURE 5; and

FIGURE 9 is a view of the unit in operation and floating in water.

As seen in FIGURE 1 the battery 11 has an upper bell shaped housing part 12 and a lower part 13. These parts are molded from suitable plastic material such as polyethylene, for example, which is unaffected by salt water and moisture, and is light and durable. At the top of part 12 is a nose piece 14 having a lamp socket therein, within which is contained an electric light bulb 16. Covering bulb 16 is a transparent housing 17 removably threaded onto nose 14. Housing part 12 is also provided with integrally molded tabs 18 having holes 19 to permit easy mounting or carrying of the unit.

As seen in FIGURE 2 lower housing part 13 forms a chamber in which are fitted outer battery plates 22, 22 and an inner or center battery plate 23. These plates are of any suitable material which, in the presence of sea water will generate a suitable voltage. Plates 22, 22 for example may be of magnesium and plate 23 of silver chloride. Plates 22, 22 have a number of holes 24 drilled therethrough into which are inserted polyethylene beads 26 as best seen in FIGURE 4, which bear against plate 23 and maintain the plates in spaced, insulated relationship. Across the top of the plates is an insulating strip 27 of suitable material through which extends a lead 28 which is connected to plate 23. Plates 22, 22 are each provided with a terminal 29 and are electrically connected together by a bridging member 31 extending across insulator 27. A lead 32 is connected to strip 31.

As was mentioned, lower housing part 13 has a chamber within which the battery plates are mounted. As best seen in FIGURE 4, this chamber has a pair of vertical slots 34 in the narrow walls thereof for receiving the ends of plate 23, which is made somewhat wider than plates 22 for this purpose. In this manner the plates as a unitary assembly are held securely in place within the chamber.

The upper end of part 13 terminates in a circular flange 36 having a stepped portion 37 for receiving in snug fitting relationship the upper bell shaped part 12 which is hermetically sealed to flange 36 upon assembly. Mounted in the flat upper surface of the flange 36 (see FIGURE 2) are a pair of anchor terminals 38 to which leads 28 and 32 are connected. Running from these terminals are a pair of leads 35 whose upper ends are connected with the lamp socket in nose piece 14. A pair of guide posts 39 between the battery plates and terminals 38 serve to position the leads and prevent tangling.

Referring now to FIGURE 3, which is a bottom view of lower part 13, and to FIGURES 5 and 6, there is molded in the underside of flange 36 an insert 41 of polyethylene, or other suitable material, which comprises a ring member 42 and a plug 43 which is supported in ring 42 by a thin integral web 44. This web is normally an impervious membrane but is easily ruptured when the plug is pulled. In similar fashion in the bottom face of part 13 is an insert 46 having a pair of plugs 47 which are integrally joined to it by thin frangible webs 48. Plugs 41 and 47 are connected together by means of a pull cord 49 which is looped through holes in the plugs, as indicated in FIGURE 5. The bottom ends of the battery plates rest upon one or more pads 51 of polyethylene, for example, which affords a slight clearance between the plates and the bottom of the battery chamber.

When it is desired to activate the battery, cord 49 is given a pull. Because the webs 44 and 48 are very thin they are easily broken and plugs 41 and 47 pulled free, as illustrated in FIGURE 7. When the battery 11 is dropped in water, some enters through the holes left by lower plugs 47, and air within the battery chamber escapes through the hole left by upper plug 41. In this manner, the chamber rapidly fills with water and the battery thereupon begins to generate a suitable voltage which will light lamp 16. When the water reaches the hole left by upper plug 43, no more water will enter the housing. The unit will then float upright, as shown in FIGURE 9, because of the air trapped inside upper housing part 12. To further insure that this upper part does not fill with water, the battery plates may be designed to evolve gas when current flows between them through the electrolyte.

From the foregoing, it is readily apparent that the battery provided by the invention is simple in structure and yet easy to activate and reliable in operation. The drawings herein were made from an actual unit and show its parts substantially to scale. It is to be understood that the foregoing is by way of illustrating the principles of the invention. Various changes in and modifications of the unit disclosed may readily occur to those skilled in the art and can be made without departing from the spirit or scope of the invention as set forth.

I claim:

1. A device of the character described comprising first and second housing members sealed together along a horizontal flange, said first housing member forming an air chamber and having mounted thereon electrical voltage terminals, said second housing member having a portion forming one wall of said air chamber formed by said first housing member, said second member forming a battery containing chamber, said chambers being connected by an air passage, a battery in said battery chamber connected to said terminals, a plurality of plugs mounted in the walls of said second member, at least one of said plugs being mounted in a lower wall part of said battery containing chamber and another of said plugs being mounted in the same portion of said second member forming one wall of said air chamber, said plugs being secured to said member by means of integral frangible webs, and a pull cord joining said plugs whereby when said cord is pulled the frangible webs give way and said plugs are pulled free of their mounting.

2. A device as claimed in claim 1 wherein said device is adapted to float in an upright position, and said wall of said air chamber formed by said second member is the bottom wall of said air chamber.

3. An emergency battery comprising a first moulded generally cylindrical bell shaped part, a second moulded generally rectangular part smaller than said bell shaped part and having a circular flange at its upper end adapted to seal against a bottom opening of said first part, said first part defining an air chamber and said second part defining a battery chamber, battery plates in said chamber, a first plug moulded in said circular flange, a second plug moulded in the bottom of said second part, and a cord engaging said plugs to pull them loose to admit water to said battery chamber, said battery being adapted to float with said bell shaped part at least partly out of water.

References Cited in the file of this patent

UNITED STATES PATENTS

| | | |
|---|---|---|
| 2,497,852 | Arenstein | Feb. 21, 1950 |
| 2,832,814 | Shannon | Apr. 29, 1958 |

FOREIGN PATENTS

| | | |
|---|---|---|
| 8,350 | Great Britain | 1894 |